United States Patent [19]

Bouck

[11] 4,030,549

[45] June 21, 1977

[54] RECOVERY OF GEOTHERMAL ENERGY

[75] Inventor: Larry S. Bouck, Tulsa, Okla.

[73] Assignee: Cities Service Company, Tulsa, Okla.

[22] Filed: Jan. 26, 1976

[21] Appl. No.: 652,022

[52] U.S. Cl. .................................. 166/280; 165/1; 165/45; 166/248; 166/281; 166/302

[51] Int. Cl.² .................. E21B 43/24; F28F 19/00; F28D 21/00

[58] Field of Search ........... 165/1, 45, 95; 166/280, 166/281, 248, 262, 270, 300, 308, 302, 303, 58, 60

[56] References Cited

UNITED STATES PATENTS

| 2,650,539 | 9/1953 | Greene | 166/58 X |
|---|---|---|---|
| 2,818,118 | 12/1957 | Dixon | 166/280 X |
| 2,962,095 | 11/1960 | Morse | 166/280 X |
| 3,227,211 | 1/1966 | Gilchrist | 166/302 X |
| 3,242,988 | 3/1966 | McGuire, Jr. et al. | 166/280 |
| 3,547,192 | 12/1970 | Claridge et al. | 166/302 X |
| 3,580,330 | 5/1971 | Maugis | 165/45 |
| 3,642,066 | 2/1972 | Gill | 166/248 |
| 3,786,858 | 1/1974 | Potter et al. | 165/45 X |
| 3,951,794 | 4/1976 | Swearingen | 165/4 X |
| 3,957,108 | 5/1976 | Van Huisen | 166/302 X |

Primary Examiner—Stephen J. Novosad
Attorney, Agent, or Firm—A. J. Reinert

[57] ABSTRACT

A subterranean formation is penetrated by a borehole. The formation is fractured and propped with a slurry capable of maintaining a thermit reaction. The slurry is ignited. Upon cooling, a solid metal conductor fin network from the bore into the formation is formed in the fracture system. Energy is transferred between a locus in the borehole and the formation by the network.

12 Claims, 2 Drawing Figures

RECOVERY OF GEOTHERMAL ENERGY

BACKGROUND OF THE INVENTION

1. Field of the Invention

The invention relates to the transfer of energy between a locus in a borehole and a subterranean formation penetrated by the borehole. In one aspect, the invention relates to formation of a structure for the recovery of heat from the geothermally heated formation by drilling a well, fracturing and propping with a slurry capable of maintaining a thermit reaction, igniting the slurry, and allowing to cool to form a conductor fin network within the formation for the conduction of heat to the locus in the wellbore. In another aspect, the invention relates to a heat recovery process for the recovery of heat from a geothermally heated subterranean formation comprising drilling a borehole into the formation, fracturing the formation with a slurry capable of maintaining a thermit reaction, igniting the slurry, allowing the molten metal formed by the thermit reaction to cool forming a metal conductor fin network from the bore into the fracture formation, and recovering heat conducted to a locus in the bore by a fluid heat recovery system.

2. Brief Description of the Prior Art

Many regions are known in which volcanic or intrusive activity has occurred recently enough so that the geothermal gradient is still as high as 150° to 190° C per km (435° to 550° F per mile). In such regions, temperatures high enough to produce commercially useful steam exist within two to three kilometers (6600 to 9800 feet of the earth's surface. In some places, natural steam can be produced from the geothermal heat.

Where natural steam is not produced, exploitation of such geothermal reservoirs has not been commerically undertaken, in spite of the fact that many of such reservoirs are closer to the earth's surface than are the lower levels of a deep mine. A principal reason for such lack of commercialization is because the thermal conductivities of the heat bearing rocks are typically very low. Though specific heats are high, so that a relatively large amount of heat is available from a unit volume of hot rock. Such heat, however, can be extracted from the rock only though some free surface such as a wall of a borehole. Since heat is conducted to that surface quite slowly, because of the low thermal conductivity of the rock, it is very difficult to remove thermal energy from the rock at a usefully high rate.

One approach to the problem of removing heat energy from such geothermal formations at useful rates is disclosed in U.S. Pat. No. 3,786,858 wherein a relatively large surface area is created by hydraulically fracturing between two well bores penetrating the geothermal formation and passing a fluid through the hydraulically created fracture system.

U.S. Pat. No. 3,857,244 discloses an advanced system for heat energy recovery from geothermally heated rock formations once the heat is transferred to a locus in the well bore adjacent to the geothermally heated rock.

U.S. Pat. No. 3,105,545 discloses injecting a slurry of metal particles into fractures formed in a hydrocarbon bearing formation to emplace closely packed metal particles in the fracture zone with subsequent circulation of heated fluid into the well to impart heat to the formation and provide for improved recovery of hydrocarbons.

My invention constitutes a substantial advance in the art by providing for efficient transfer of energy between a locus in a borehole and a subterranean formation. In a particular aspect, my invention provides for more efficient recovery of heat from a geothermal formation by overcoming the lack of sufficient thermal conductivity of the reservoir rock for feasible heat extraction.

OBJECTS OF THE INVENTION

An object of the invention is to provide a process for the formation of a structure for the transfer of energy between a locus in a borehole and a subterranean formation penetrated by the borehole.

Another object is to provide a process for the recovery of heat from a geothermically heated subterranean formation.

SUMMARY OF THE INVENTION

A structure and system for the transfer of energy between a locus in a borehole and a subterranean formation is formed by (a) drilling a borehole from the surface into the formation, (b) fracturing and propping the formation by injecting a fracturing and reactive slurry into the formation, the slurry comprising finely divided aluminum and a reactive metal oxide in a fluid carrier, (c) igniting the reactive slurry within the formation so that the aluminum and metal oxide components thereof react with a thermit reaction to form a liquid metal within the fracture system formed in the formation by the fracturing and propping, and (d) allowing the liquid metal in the formation to cool and solidify within the fractured system.

Thus, in one aspect, a geothermally heated formation is penetrated by a bore. The formation is fractured and propped with a slurry capable of maintaining a thermit reaction. The slurry is ignited. Upon cooling, a solid iron conductor fin network from the bore into the formation in the fracture system is formed. Thermal energy is conducted by the network from the formation to a locus in the bore where it is recovered to the surface by a liquid or liquid-vapor recovery system.

According to another aspect of the invention, a hydrocarbon-bearing formation is penetrated by a bore. The formation is fractured and propped with a slurry containing particles of iron oxide and particles of aluminum oxide. The metallic components are ignited in the fracture system. After a thermit reaction has occurred and cooling has occurred, a solid iron conductor fin network from the bore into the fracture system in the formation is formed. Thermal energy is conducted by the network into the formation from a surface source by a liquid or liquid-vapor heat transfer system.

DESCRIPTION OF THE DRAWINGS

Figure 1:
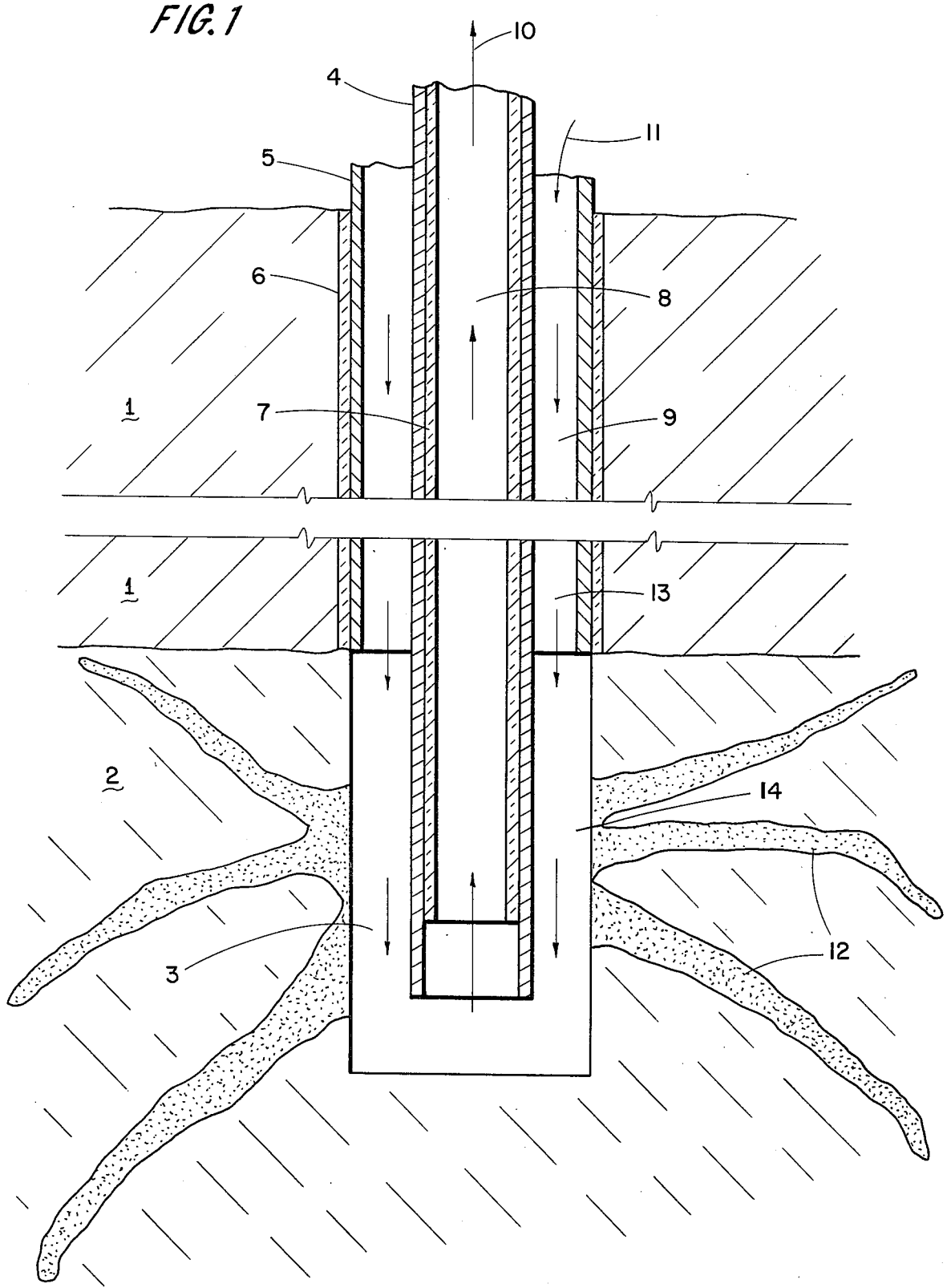
FIG. 1 illustrates a cross section of a borehole penetrating a subterranean formation having the energy transfer system and structure of the invention emplaced therein.

FIG. 1 illustrates a cross section of a subterranean formation having the structure of this invention emplaced therein. The subterranean formation 2 is overlain by overburden 1 and penetrated by well bore 3.

According to a presently preferred mode, the subterranean formation 2 is a geothermically heated formation. Well casing 5 extends to the upper region of the formation 2 and is insulated from the overburden 1 by insulation 6. A solid metal conductor fin network 12 is emplaced in the formation 2 by fracturing and propping the formation 2 by injecting a reactive slurry down the well bore into the formation 2 at a pressure above the fracturing pressure of the formation, the fracturing and propping slurry containing finely divided aluminum and a reactive metal oxide such as iron oxide in a fluid carrier; preferably following injection of the reactive slurry by a non-reactive slurry so that reactive slurry does not extend above the upper level of the formation 2; igniting the reactive slurry within the well bore as with a pyrotechnic device such that the aluminum and the metal oxide in the reactive slurry react to form a liquid metal within the fracture system formed in the formation; allowing the liquid metal in the formation to cool and solidify thus formimg the solid metal conductor fin network 12 extending from the bore 3 into the formation 2; and preferably re-boring well bore 3 within the formation 2.

Thereupon, tubing 4 having insulation 7 on the interior is inserted into the well bore 3 having passageway 8 therein and forming annulus 9 within the well bore.

The emplaced system described above is employed according to one presently preferred mode to produce heat from a formation 2 when formation 2 is geothermically heated according to the following mode of operation: heat is conducted from formation 2 by the solid metal conductor fin network 12 to a locus in the well bore 14; a relatively cool fluid 11 is injected through annulus 9 passing locus 14 (having a high geothermal heat transfer thereto by virtue of the conductor fin network 12) whereupon the fluid is heated; with continuing flow of the fluid 10 from the well through passageway 8. Useful heat energy is extracted from the fluid 10, which can be, for example, steam or heated water, by conventional systems such as heating radiators, electric power generating turbines, and the like, with recycle of the fluid having the heat extracted therefrom as fluid 11.

According to another presently preferred mode of operation, heated fluid 11 is injected through annulus 9 to heat a subterranean formation 2 (which is a hydrocarbon bearing formation in this mode) by conducting of heat given up by the fluid 11 at locus 14 by the solid metal conductor fin network 12, with return of the cooled fluid through passageway 8 for optional recycle through a surface heat source.

It is also within the scope of this invention to employ a structure having the solid metal conductor fin network emplaced in a hydrocarbon bearing formation to impart heat to that formation by imparting electric energy through the conductor fin network to the formation.

Figure 2:
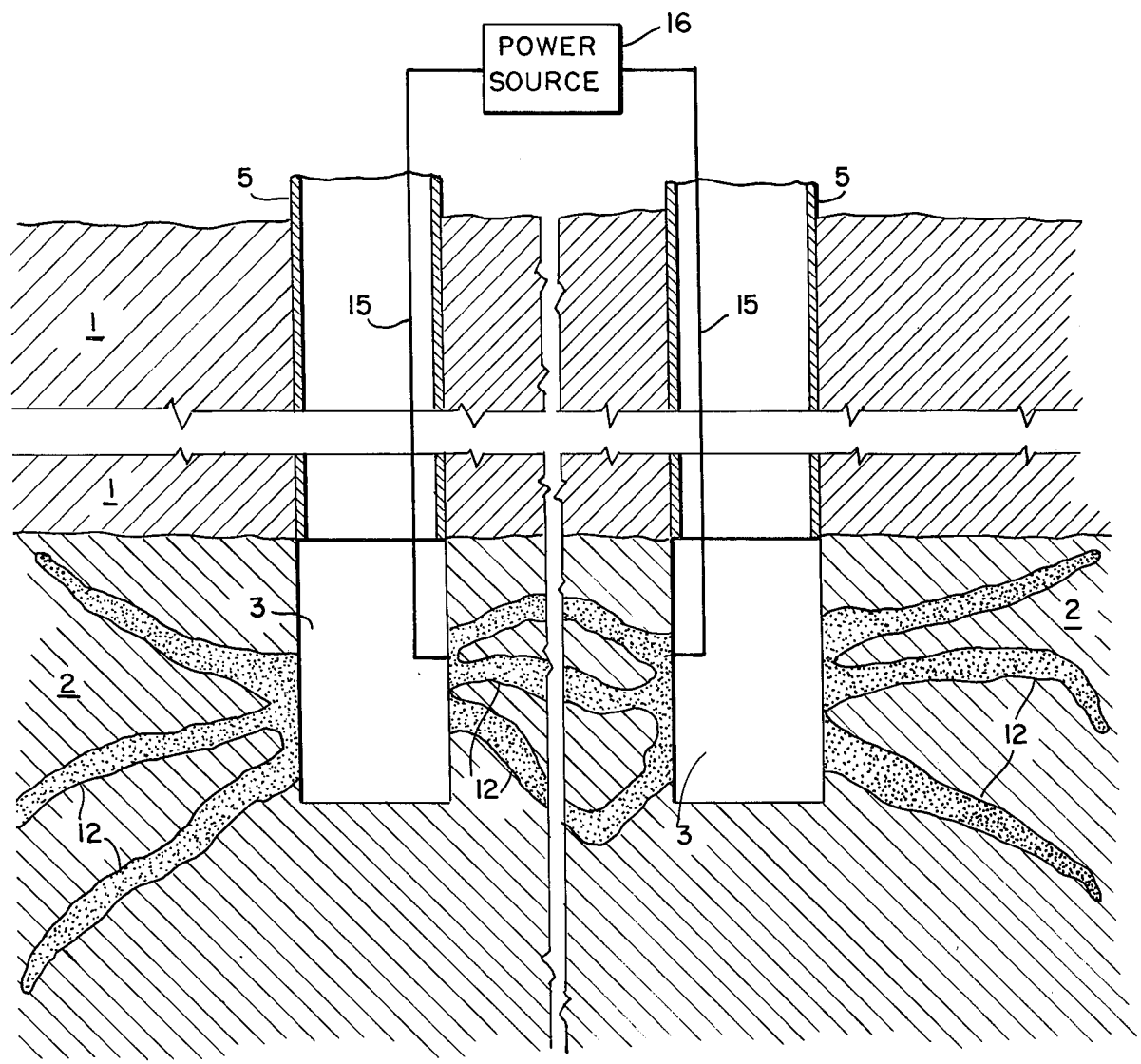
FIG. 2 illustrates a cross section of two bore holes penetrating a subterranean formation having an electrical energy transfer system and structure of the invention emplaced therein.

Thus, according to one embodiment, as illustrated in FIG. 2, two wells penetrating a hydrocarbon formation 2 are completed as hereinabove described, and electrical contact is made through a conductive metal wire 15 between a surface electrical generating source 16 and the solid metal conductor fin network 12 in the two wells. An electric current is passed between the wells to heat the formation 2 therebetween, and mobilize hydrocarbons therein.

PREFERRED EMBODIMENTS OF THE INVENTION

Examples

To illustrate the invention, a well bore is drilled from the surface into a geothermically hot formation to a depth of 10,000 feet. The formation penetrated from well bottom to more than 500 feet above that point is a dense crystaline dry rock having a temperature of about 900° F. The well is cased and insulated from the overburden to a depth of 9,700 feet.

Thereupon, an aqueous based polymer thickened slurry containing finely divided particles of Al and $Fe_2O_4$ in a stochiometric ratio of 8:3 is injected into the well at high pressure to effect extensive fracturing in the formation below the well casing. The reactive slurry injected also has sufficient propping agent included therein to hold the fracture system open. A sufficient amount of less dense slurry is then injected to further fracture the formation and move the reactive slurry below the cased portion of the well.

A pyrotechnic device is inserted down hole into the reactive slurry. Pressure is maintained on the well.

The pyrotechnic device is ignited by electrical means thus igniting the reactive slurry. A thermit or Goldschmidt aluminothermic reaction occurs in the reactive slurry forming molten iron and alumina slag. Extensive heat energy is evolved from the thermit reaction forming an iron conductor fin network within the formation and extending to the locus of the well bore below the cased area. The formation in the locus of the well is allowed to cool and the molten iron solidifies in intimate contact with the formation forming a solid iron conductor fin network within the formation connected to the well bore.

Thereupon, the well bore is milled to hole bottom at a dimension approximately two-thirds of its original diameter.

Thereupon, a pipe insulated on the interior is run to within a few feet of well bottom. Water is injected into the annulus between the casing and the insulated tubing string passing down the annulus in the locus of the iron conductor fin network, forming steam, and then returning to the surface through the insulated tubing string to deliver high temperature and high pressure steam to the surface.

The steam is employed to run a turbine which drives an electrical generator. Condensate is recycled to the well.

By way of further exemplification, a well and structure is completed and prepared as above but into a hydrocarbon-bearing formation instead of a geothermically heated formation.

Upon completion, steam is injected down the annulus between the tubing string and the casing with substantial back pressure held on the tubing string. Outlying wells are completed in the formation. Heat imparted to the formation along with the steam and hot water injected result in substantial recovery of hydrocarbons from the outlying wells.

By way of further exemplification, a well and structure is completed and prepared as above into a hydrocarbon bearing formation.

Upon completion electrical contact is made between the iron conductor fin network and a surface generating source. Thereupon energy is imparted into the formation by conducting electricity from the surface source down the well bore and into the formation by means of the iron conductor fin network.

These examples are provided in order to more fully explain the present invention and provide information to those skilled in the art on how to carry it out. However, it is to be understood that these examples are not intended to function as limitations on the invention as described and claimed herein.

Fracturing and propping of subterranean formations is well known to those skilled in the art and much data and information on how to effect it are widely available.

The thermit or Goldschmidt process is an aluminothermic method for the production of molten iron or steel. The principle feature of the reaction is the exothermic reaction of aluminum in a divided form and a metal oxide such as iron oxide to produce liquid metal, alumina and considerable heat. It is known to employ mixtures of metal oxides and/or metals to impart corrosion resistance to the solidified liquid metal produced. Metals such as nickel, copper, chromium, vanadium and the like can be employed. It is within the scope of this invention to form structures having corrosion resistance in this manner. The process is well known and much data and information relating to it are available to those skilled in the art.

What is claimed is:

1. A process for the formation of a structure for the transfer of energy between a locus in a borehole and a subterranean formation comprising:
   a. drilling a borehole from the surface into the formation,
   b. fracturing and propping the formation adjacent to the locus by injecting a reactive slurry into the formation at a pressure above the fracturing pressure of the formation, the slurry comprising finely divided aluminum and a reactive metal oxide in a fluid carrier,
   c. igniting the reactive slurry within the formation so that the aluminum and the metal oxide therein react to form a liquid metal within the fracture system formed in the formation, and
   d. allowing the liquid metal in the formation to cool and solidify within the fracture system.

2. The process of claim 1 wherein:
   e. the reactive slurry of (b) comprises finely divided aluminum and iron oxide in an aqueous carrier thickened with a polymer,
   f. the reactive slurry is substantially displaced into the formation by injecting sufficient of a non-reactive slurry to substantially displace the reactive slurry from the wellbore above the locus subsequent to step (b) of claim 1 and prior to the ignition of step (c) of claim 1, and
   g. sufficient pressure is maintained on the column of non-reactive slurry in the wellbore to prevent backflow of the reacting slurry following ignition and prior to solidification.

3. The process of claim 1 wherein the structure is made corrosion resistant by incorporating a corrosion resistance imparting metal or metal compound into the reactive slurry.

4. A process for the recovery of heat from a geothermically heated subterranean formation comprising:
   h. drilling a borehole from the surface into the formation,
   i. fracturing and propping the formation by injecting a reactive slurry into the formation at a pressure above the fracturing pressure of the formation, the reactive slurry comprising finely divided aluminum and a reactive metal oxide in a fluid carrier,
   j. igniting the reactive slurry within the formation so that the aluminum and metal oxide therein react to form a liquid metal within the fracture system formed in the formation,
   k. allowing the liquid metal in the formation to cool and solidify within the fracture system, and
   l. withdrawing heat from a locus in the wellbore adjacent to the solidified metal which is conducted thereto from within the formation by the solidified metal within the fracture system.

5. The process of claim 4 wherein:
   m. the reactive slurry of (i) comprises finely divided aluminum and iron oxide in an aqueous carrier thickened with a polymer,
   n. the reactive slurry in substantially displaced into the formation by injecting sufficient of a less dense non-reactive slurry to substantially displace the reactive slurry from the wellbore above the geothermically heated subterranean formation subsequent to step (i) and prior to the ignition of step (j) and
   o. sufficient pressure is maintained on the column of non-reactive slurry in the well bore to prevent backflow of the reacting slurry following ignition and prior to solidification.

6. The process of claim 5 wherein heat is withdrawn from the geothermically heated formation by circulating a fluid to the locus in the well bore and returning the heated fluid to the surface.

7. The process of claim 6 wherein water is circulated to the locus and steam is returned to the surface.

8. A process for imparting energy to a hydrocarbon containing subterranean formation comprising:
   p. drilling a bore hole from the surface into the formation,
   g. fracturing and propping the formation by injecting a reactive slurry into the formation at a pressure above the fracturing pressure of the formation, the reactive slurry comprising finely divided aluminum and a reactive metal oxide in a fluid carrier,
   r. igniting the reactive slurry within the formation so that the aluminum and metal oxide therein react to form a liquid metal within the fracture system formed in the formation,
   s. allowing the liquid metal in the formation to cool and solidify within the fracture system, and
   t. imparting energy into the formation from a locus in the well bore adjacent to the solidified metal by conduction through the solidified metal within the fracture network.

9. The process of claim 8 wherein:
   u. the reactive slurry of (q) comprises finely divided aluminum and iron oxide in an aqueous carrier thickened with a polymer,
   v. the reactive slurry is substantially displaced into the formation by injecting sufficient of a less dense non-reactive slurry to substantially displace the reactive slurry from the well bore above the hydrocarbon containing subterranean formation subsequent to step (q) and prior to the ignition of steps (r) and (v), sufficient pressure is maintained on the column of non-reactive slurry in the well bore to prevent backflow of the reacting slurry following ignition and prior to solidification.

10. The process of claim 9 wherein the energy is imparted into the formation by conducting electrical energy from a surface generating source through a conductor and through the solidified metal into the formation.

11. The process of claim 9 wherein the energy is supplied to the locus of (t) by circulating a heated fluid to the locus and returning cooled fluid to the surface.

12. The process of claim 11 wherein steam is circulated to the locus.

* * * * *